3,373,223
COMPOSITIONS CONTAINING POLYAMIDES, POLYOLEFINS, AND ETHYLENE-ACRYLIC OR METHACRYLIC ACID COPOLYMERS
Robert G. Armstrong, Chicago Heights, Ill., assignor to Continental Can Company, Inc., New York, N.Y., a corporation of New York
No Drawing. Filed Sept. 28, 1965, Ser. No. 491,029
20 Claims. (Cl. 260—857)

ABSTRACT OF THE DISCLOSURE

Homogeneous polymeric blends resistant to permeation by organic fluids may be prepared from 25–90% of a polyolefin resin, 5–70% by weight of a polyamide resin, and 1–10% by weight of an ethylene-acrylic or methacrylic acid copolymer wherein the acid component is present in the range of 1–10 mole percent.

---

This invention is directed to a polymeric resin composition and more specifically to a homogeneous polymeric blend and to a method of preparing same. Still more specifically, this invention is directed to a homogeneous polymeric blend which is substantially resistant to the permeation of fluids and is capable of being shaped, e.g., extruded into various non-pinch crazing forms by conventional methods.

The homogeneous polymeric compositions or blends of this invention are prepared by dispersing a water-insoluble polyamide resin in a polyolefin resin with a copolymer of ethylene and acrylic acid or ethylene and methacrylic acid. The ethylene-acrylic and methacrylic acid copolymers improve the dispersion of the polyamide in the polyolefin to form a stabilized blend which does not agglomerate in the molten state. These homogeneous polymeric blends are highly useful for the preparation of films for use in packaging and more particularly for the preparation of plastic bottles and other containers which require outstanding impermeability properties.

More specifically, the homogeneous polymeric blends or compositions of this invention consist essentially of 25–90% by weight of a polyolefin resin such as polyethylene or polypropylene, 5–70% by weight of a water-insoluble polyamide resin, i.e., nylon, and 1–10% by weight of an ethylene-acrylic or ethylene-methacrylic acid copolymer. This homogeneous blend is substantially resistant to the permeation of fluids including many of the organic solvents and may be shaped by conventional methods into various non-pinch crazing forms without any difficulties at temperatures ranging from about 300° to 500° F. and at pressures ranging from about 10 to 5,000 pounds per square inch.

With the continuous development of the polyolefins and with their widespread use, particularly polyethylene and polypropylene, it has become necessary to improve on the mechanical characteristics of these polymers so that they can be utilized for preparing various articles of commerce including, for example, film, fibers, sheets, bottles and other containers needed for packaging such items as foodstuffs, oils, cosmetics, hair tonics, deodorants, medicinals, liquid bleaches, detergents and the like.

Generally, polyethylene has been used for these purposes because of its relative inertness, structural strength and flexibility even at low temperatures. Moreover, polyethylene is easily fabricated in commercial quantities at reasonable cost and is, therefore, highly desirable as a packaging material. Heretofore, small amounts of chemically inert and physically active inorganic compounds have been kneaded into the polyolefins to obtain blends having improved impact resistance and other morphological properties, such as internal cohesion, abrasion resistance, etc. While these additives improved the polymers' morphological characteristics, they did not, however, prove sufficient to improve on the polymers' resistance to pinch-crazing. It is important, particularly in preparing plastic pinch-bottles or the like, to have a material which has a quick deformation recovery and a high resistance to pinch-crazing. Thus, it has been found that by blending a water-insoluble polyamide resin with the polyolefin resin in accordance with the methods of this invention, it is possible to obtain a homogeneous blend of the polyolefin and the polyamide. The blend is not only improved with respect to pinch-craze but also, and more important, is improved with respect to its mechanical characteristics and is substantially resistant to the permeability of organic solvents.

One of the limitations of plastic materials normally used for preparing containers, for example, is that these materials are highly permeable to many of the organic solvents which are conventionally used for the formulation of the above-mentioned commercial products. For example, the various chemicals which permeate polyethylene at room temperature include the aliphatic and aromatic hydrocarbons, esters, ketones, and many of the other known solvents. Consequently, the use of polyethylene has been restricted to those products to which the resin is substantially impermeable. Moreover, in some special cases it has become necessary to utilize a time-consuming and expensive technique of coating the polyethylene with a layer of polymeric material which is impermeable to the product. These coating materials include, for example, polyvinyl chloride, polyvinyl alcohol, copolymers of vinylidene chloride, polyamides, epoxide resins, etc. These coatings are normally applied on the side of the film or bottle which is in direct contact with the product being packaged. This involves pretreating the inside of the bottles or containers by known methods such as flaming, electrical discharge, chlorination or chemical oxidation to improve the adhesion of the coating material to the polyethylene surface.

In comparison to the polyethylene, however, the polyamides of the nylon type are substantially resistant to the permeability of many of the organic solvents indicated above and, additionally, may be easily printed on without the requirement of a surface treatment. Thus, while nylon and polyethylene are regarded as incompatible materials in that they have dissimilar properties, it would be highly advantageous if the desirable characteristics of each of these polymeric materials could be incorporated to a single product.

In order to avoid the above-mentioned problems and to prepare a product having the advantages of both a polyolefin resin and a polyamide resin, it has been discovered that the polyamide can be dispersed in the polyolefin resin by utilizing a small but an effective amount of an ethylene-acrylic or methacrylic acid copolymer. These copolymers not only improve the dispersion of the two materials but also stabilize the dispersion against agglomeration in the molten state. This suggests that the prevention of agglomeration or phase separation is accomplished by chemical attraction rather than mechanical action or viscosity fortification. Moreover, at low concentrations, i.e., 1 to 10% by weight, the ethylene-acrylic and methacrylic acid copolymers have no effect on the viscosity of the nylon-polyolefin blend.

Accordingly, it is an object of this invention to provide a homogeneous polymeric blend which is substantially resistant to the permeation of organic fluids and capable of being shaped into various non-pinch crazing forms without any difficulties.

It is still another object of this invention to provide a homogeneous polymeric blend which is substantially resistant to the permeation of organic fluids and which is capable of being extruded into various non-pinch-craze forms at temperatures ranging from about 300° to 500° F. and at pressures ranging from about 10 to 5,000 pounds per square inch.

It is still another object of this invention to provide a method of preparing a polymeric resin composition which is substantially resistant to the permeation of organic fluids and capable of being shaped to various non-pinch crazing forms which comprises shaping said polymeric composition at temperatures ranging from about 390° to 450° F. and at pressures ranging from about 400 to 2,000 pounds per square inch.

It is still another object of this invention to provide a method of preparing a homogeneous polymeric composition which is substantially impermeable to organic fluids and has outstanding mechanical characteristics.

It is still a further object of this invention to provide a method of dispersing a polyamide such as nylon into a polyolefin resin to obtain homogeneous blend which is stabilized against agglomeration in the molten state. The polyamide resin is dispersed in the polyolefin resin by means of small but effective amounts of either an ethylene-acrylic or ethylene-methacrylic acid copolymer.

It is still a further object of this invention to provide a homogeneous polymeric blend and a method of preparing same which is substantially impermeable to organic fluids and can be used in conventional extruding apparatus for the preparation of plastic bottles and other containers.

It is still a further object of this invention to provide a homogeneous blend of a polyamide resin and a polyolefin resin which is substantially impermeable to organic fluids and which can be shaped into various forms by conventional methods into non-pinch crazing bottles and containers.

These and other objects of the invention will become apparent from a further and more detailed description of the invention as follows.

It has been discovered that a homogeneous blend of a polyamide resin and a polyolefin resin can be obtained by dispersing the polyamide in the polyolefin with small but effective amounts of an ethylene-acrylic or -methacrylic acid copolymer. More specifically, it has been discovered that homogeneous polymeric blends, which are substantially resistant to permeation of organic fluids, can be obtained by dispersing the polyamide into the polyolefin resin at temperatures ranging from about 300° to 500° F. and at pressures ranging from about 10, to 5,000 pounds per square inch. More preferably, the ethylene-acrylic or methacrylic acid copolymers are used to disperse the polyamide in the polyolefin at temperatures ranging from about 390° to 450° F. at pressures ranging from about 400 to 2,000 pounds per square inch.

The homogeneous blend consists essentially of 25–90% by weight of a polyolefin resin, such as polyethylene or polypropylene, 5–70% by weight of a water-insoluble polyamide resin such as nylon, and about 1–10% by weight of an ethyleneacrylic or methacrylic acid copolymer wherein the acrylic or methacrylic acid ranges from about 1 to 10 mole percent. When utilizing the low density polyethylene, however, it is desirable to blend 40–55% by weight of the water-insoluble polyamide resin with about 40–55% by weight of the polyolefin. The ethylene-acrylic or methacrylic acid copolymers may be used in amounts of 1–10% by weight of the mixture of the polyamide and polyolefin and more preferably in amounts ranging from about 2–6% by weight. The copolymers are characterized as being copolymers of ethylene and acrylic or methacrylic acid wherein 1–10 mole percent and more preferably 2–5 mole percent of the copolymer is acrylic or methacrylic acid.

The polyamides herein referred to as nylons are water-insoluble polyamides having recurring amide groups and are commercially available. They can be prepared, for example, from a cyclic ketone which is obtained by hydrogenating phenol to cyclohexanol which, in turn, is converted to cyclohexanone. The cyclic ketone is reacted with nitrogen-containing compounds to form seven-membered ring compounds, such as epsilon amino caprolactam, which is polymerized to a commercially known nylon. Still other processes include the reaction of a dibasic organic acid, such as adipic or sebacic, which is reacted with a diamine, such as hexamethylene diamine, to form long-chain polymers commercially available as nylon. The number of connected carbon atoms between successive amide groups in the nylon depends upon the starting compound. In the above examples, for example, there are six carbon atoms but other nylons have been prepared with a different number of carbon atoms between the amide groups.

These polyamides or nylons may be defined also as water-insoluble, fiber-forming, synthetic polymeric carbonamides which contain recurring carbonamide groups as an integral part of the main polymer chain separated by at least two carbon atoms. A polyamide, for purposes of this invention, may be prepared, for example, by reacting approximately 15 parts by weight of hexamethylene diamine with about 30 parts by weight of sebacic acid in the presence of about 45 parts by weight of a solvent. The reactor is fitted with a distillation unit to return the solvent lost by distillation and a means of introducing nitrogen into the reactor. The mixture is heated for approximately 10–15 hours at about 210°–220° C. The reaction products are then treated with an aliphatic alcohol to precipitate the polyamide as a white granular material.

The polyamides may be prepared also by reacting, for example, a carboxylic acid with a primary amine wherein the amine has at least two hydrogen atoms attached to each of the nitrogen atoms. This includes such compounds as ethylene diamines, tetramethylene daimine, pentamethylene diamine, hexamethylene diamine, octamethylene diamine, decamethylene diamine, and other primary amines with at least two carbon atoms between the amine groups. The carboxylic acids used in forming the amides include adipic acid, suberic acid, sebacic acid, azelaic acid, malonic acid, glutaric acid, pimelic acid, etc. Typial examples of the polyamides include polypentamethylene adipamide, polyhexamethylene adipamide, polydecamethylene adipamide, polyoctamethylene adipamide, polyoctamethylene sebacamide, polyhexamethylene sebacamide, polypentamethylene sebacamide, polydecamethylene suberamide, polyhexamethylene suberamide, polypentamethylene suberamide, the polyamides obtained from lactams, such as caprolactam and from the amino acids, such as 11-aminoundecanoic acid.

Nylon by itself is substantially impermeable to organic liquids including the ethers, esters, hydrocarbons, etc., and has a high tensile strength in comparison to polyethylene. However, the polyamides or nylons are permeable to the lower alcohols, water and their vapors. In addition, the polyamides or nylons may be extruded only within a narrow range of temperatures above its melting point and, therefore, close temperature control is necessary in obtaining the proper viscosity for extrusion. This narrow temperature range complicates the ues of nylon in blowing containers, such as bottles, from tubing by procedures normally employed for polyethylene. Moreover, the polyamides tend to yellow at extrusion temperatures particularly if exposed to air and, therefore, in many instances are not satisfactory.

One of the characteristics of the polyamide type nylons is the degree of crystallinity at room temperature which depends on various factors, including the degree of orientation or stretching, the rate of cooling from the melt and the annealing conditions. In comparison, polyethylene, upon cooling to room temperature, generally crystallizes to a degree dependent upon the chemical structure rather than the orientation or annealing conditions. Moreover, in comparison to the polyolefins, the degree of permeability attributed to nylon is generally due to its chemical composition rather than the percent of crystallinity. However, the permeability of polyethylene, for example, depends upon the crystalline content of the polymer as determined by its structure, i.e., linear vs. branched, with the degree of permeability decreasing with increasing crystallinity.

The polyolefin resins and more specifically polyethylene may be prepared by known processes and may be characterized as a low density polyethylene having a specific gravity of about 0.92 or a high density polyethylene having a specific gravity of about 0.95. The low density polyethylenes are often referred to as regular branched chain polyethylenes and are commercially available. These polyethylenes have been examined under X-rays and have been found to comprise a crystalline content of about 50–55%. These polyethylenes are substantailly permeable, particularly those polyethylenes which have a low percentage of crystalline macromolecules. The degree of permeability, however, decreases as the percent of the crystalline macromolecules increases. For example, a standard four-ounce bottle of polyethylene containing 50% crystalline macromolecules has been found to be permeated by heptane under standard test conditions to a loss of about 40 times the internal capacity of the container over a period of about one year.

The melting range of the commercial polyethylenes begins at a softening point of about 220° to 230° F. and, therefore may be extruded at temperatures ranging up to about 500° F. These higher extrusion temperatures may be employed since the viscosity of the polyethylene has a slow rate of change with temperature with little or no degradation during the heating and extrusion process. In addition to the low density polyethylenes, the high density polyethylenes having a specific gravity around 0.95 are also commercially available and contain crysatlline macromolecules ranging from 70–85% with a corresponding reduction in its permeation to organic solvents.

Another polyolefin resin which may be used for purposes of this invention includes polypropylene and more specifically isotactic polypropylene which may be characterized as a crystalline to semi-crystalline polymer having a specific gravity or a density of about 0.91. The isotactic polypropylene, for example, may be characterized as a linear, regular head-to-tail polymer of propylene having a high degree of crystallinity which apparently is due to the fact that at least for long portions of the main polymer chain, all of the asymmetric carbon atoms have the same steric configuration.

The polymers of propylene depending on their steric structure and molecular weight exhibit different characteristics. The amorphous polymers, for example, have viscous elastic properties which lie between those of a highly viscous liquid and those of an unvulcanized, non-crystallizable elastomer, whereas the solid, highly crystalline polymers, which may be oriented, are fiber-forming. Both the amorphous and crystalline polymers of propylene are, however, linear as shown by their infra-red spectra and have a highly stereo-regular structure as determined by X-ray data. The isotactic polypropylenes which may be highly crystalline can be prepared by polymerizing propylene with the aid of a catalyst consisting of a mixture, in an inert solvent, of an aluminum alkyl compound such as aluminum triethyl and a heavy metal compound such as titanium tetrachloride. Other catalytic systems, however, may be used for preparing polypropylenes and more specifically the isotactic polypropylenes.

The copolymers used in dispersing the water-insoluble polyamide in the polyolefin resin may be characterized as copolymers of ethylene and acrylic or methacrylic acids wherein the acrylic or methacrylic acids range from about 1 to 10 mole percent and more preferably, 2 to 5 mole percent of the copolymer. For example, a preferred copolymer of ethylene and acrylic acid contains approximately three mole percent of acrylic acid and has a neutralization equivalent of about 973, a density of about 0.93 and a melt index of about 5.0. Other physical properties of the copolymer measured at 23° C. include the tensile strength (p.s.i.) of about 3360, percent elongation 595, tensile impact 3500, rigidity (p.s.i.) $1.5 \times 10^4$, hardness (shore C) 85, and a dielectric constant (one megacycle) of 2.30.

A commercially available copolymer of ethylene and acrylic acid is known as Dow QX–3623.7 which has a neutralization equivalent of about 973, and a carbon-hydrogen-oxygen ratio of 83.23, 13.66 and 3.51, respectively. The neutralization equivalents were determined by titrating the copolymer in a mixture of butyl alcohol-xylene at a ratio of 1 to 5 with 0.1 normal potassium hydroxide in butyl alcohol with cresol red.

A typical illustration of a method of preparing the products of this invention is as follows:

*Example I*

An extruder feed mixture was prepared by tumble-mixing approximately 47.5% by weight of polyethylene and 47.5% by weight of a water-insoluble polyamide (Spencer nylon 600) and about 5% by weight of a copolymer of ethylene and acrylic acid, wherein the acrylic acid is approximately three mole percent by weight of the copolymer.

The feed material was fed into a one-inch extruder equipped with a polyethylene screw and operated at a temperature to produce a melt of about 432° to 438° F. The extruder, with the feed mixture being operated at the above melt temperatures, was equipped with a 55 hole breaker plate with holes of approximately 0.1 inch diameter and a ⅛ of an inch diameter extrusion orifice. The extruder was operated at approximately 11 r.p.m. and at a pressure, as measured at the end of the screw, of approximately 10 to 50 pounds per square inch. The polymeric blend obtained by using the ethylene-acrylic acid copolymer as the dispersant had outstanding stability as illustrated by the following test.

Twenty micron thick cross-section samples of the extrudate cylinder were prepared using a microtome. The samples, placed on a microscope slide, were heated and observed in a hot stage at 235° C. for about four minutes. The slide containing the samples was removed from the hot stage and observed microscopically through cross polarizing lenses while being cooled with air.

Photomicrographs made of the polymer blends before and after the hot stage treatment and visual microscopic observation of the samples showed that polymer blends of the aforementioned polyethylene and nylon which contained approximately 5% by weight of the copolymer were substantially more resistant to agglomeration than the same polymer blends without the ethylene-acrylic acid copolymer. The control sample of ethylene and nylon without the copolymer was extruded and hot stage tested in the same manner as the polymeric blends containing the copolymer. Other polymeric blends were prepared by the same method wherein the polyethylene ranged from about 25–90% by weight, nylon ranged from about 5–70% by weight and the ethylene-acrylic or methacrylic acid copolymers ranged in amounts from about 1–10 and more preferably 2–6% by weight.

The various blends of nylon and polyethylene were extruded at pressures ranging from 10 to 5,000 pounds per square inch and more preferably at pressures ranging from about 400 to 2,000 pounds per square inch at temperatures ranging from about 390° to 500° F.

Typical preferred mixtures used in extruding comprise 40 to 55% by weight of polyethylene, 40 to 55% by weight of nylon and 2 to 6% by weight of an ethylene-acrylic acid copolymer. The extruder used in preparing blends of these mixtures was a one-inch extruder which had a feed throat at room temperature, a rear-heater temperature of 390° F., a middle-heater temperature of 400° F., a front-heater temperature of 410° F. and a die-heater temperature of 420° F.

A number of four-ounce cylindrical bottles were prepared according to the process of Example I and were tested for 28 days at 102° F. to determine the percent loss.

TABLE I

| Permeant | Percent Loss Per Year | | |
| --- | --- | --- | --- |
| | Low Density Conaloy [1] | High Density Polyethylene | Low Density Conaloy Plus Copolymer [2] |
| Heptane | 0.19 (average) | 75.55 (average) | 0.02 (average) |

[1] Conaloy is a 50/50 blend of polyethylene and nylon.
[2] Conaloy plus copolymer is approximately 50/50 blend of nylon and polyethylene plus 5% by weight of an ethylene-acrylic acid copolymer wherein the acid is present in the copolymer at about three mole percent.

It is noted from the above data that the low density Conaloy which is a blend of low density polyethylene (density of 0.92) and nylon had an average loss of heptane of about 0.19% over a period of about one year, with the high density polyethylene (density of 0.95) having a loss of about 75.55%. With the addition, however, of approximately 5% by weight of an ethylene-acrylic acid copolymer to the blend of polyethylene and nylon (Conaloy), the average percent loss of heptane after a period of one year was only 0.02%.

Additional four-ounce cylinder bottles were blown on a Blow-O-Matic and were tested for their impact resistance as indicated in Table II.

TABLE II.—DROP TEST RESULTS (STAIRCASE METHOD)

| Four-Ounce Bottles | Average Weight (Grams) | Failure Height | | |
| --- | --- | --- | --- | --- |
| | | Average | Minimum | Maximum |
| Conaloy | 12.8 | 7.5 | 5 | 10 |
| Do | 12.7 | 7.0 | 6 | 9 |
| Do | 13.8 | 6.8 | 5 | 9 |
| Do | 13.9 | 6.5 | 6 | 7 |
| Do | 13.6 | 6.2 | 5 | 10 |
| Do | 12.9 | 5.3 | 4 | 7 |

The bottles in Table II were prepared from a Conaloy blend comprising about 50% by weight of nylon-600, 45% by weight of polyethylene and 5% by weight of an ethylene-acrylic acid copolymer wherein the acrylic acid was approximately three mole percent. The bottles were prepared in accordance with the procedure of Example I at a melt temperature of about 430° F., a screw speed of about 20 r.p.m. and a pressure of about 825 pounds per square inch. It was found that the drop impact resistance of the untreated bottles was considerably low in comparison to the treated polyethylene-nylon blends prepared in accordance with this invention as indicated by the Conaloy examples in the above table.

Many of the problems encountered in preparing blends of nylon and a polyolefin usually result in phase separation or agglomeration. It was found, however, that the blends could be satisfactorily stabilized by dispersing the nylon in the polyolefin, i.e., polyethylene, by using the copolymer, although the mechanism by which this improvement is obtained is not completely understood. Regardless of the mechanism, however, it has been found that by utilizing small amounts of an ethylene-acrylic or methacrylic acid copolymer, it was possible to disperse the nylon in the polyolefin to obtain a homogenous blend without any difficulty even at comparatively low pressures, e.g., 10 to 50 pounds per square inch. Heretofore, in preparing blends of nylon and a polyolefin, it was necessary to use pressures which exceeded about 400 pounds per square inch and more preferably pressures which exceeded 500 pounds per square inch. Because of the dispersing characteristics of the copolymers, however, homogeneous blends of nylon and polyethylene may be prepared at comparatively low pressures at temperatures ranging from about 390° to 450° F.

It has been shown that blends of polyolefins, such as polyethylene or polypropylene, with pure nylon have a significantly lower permeability factor for various organic solvents than either of the polymers alone. Thus, it may be theorized that the non-crystalline nylon or polyamide occupies the regions of the amorphous macromolecules of the polyethylene which have a low degree of resistance to permeation. The reduction in the permeability of polyethylene, for example, with increased crystalline macromolecules, supports this view. In other words, the nylon locates itself in the areas of the molecule where the polyethylene or polypropylene exhibits permeability and, thus, acts as a barrier. More specifically, it has been found that a mixture of about 50 parts by weight, for example, of a 50% crystalline polyethylene is made substantially impermeable by the addition of about 50 parts by weight of nylon, whereas only 20 parts by weight of nylon is needed for polyethylene having 70% crystallinity to obtain substantially the same results.

Thus, it is desirable to disperse that proportion of nylon in the polyolefin which represents the non-crystalline or amorphous portion. This co-action of the nylon with the non-crystalline component of the polyolefin, however, is not the sole criteria for obtaining impermeable blends. It is possible, for example, that intermolecular grafting, produced by relative shear flow at high pressures, may produce composite molecules effective as blending agents for the normally incompatible components and, thus, provide a product of higher resistance to permeation and delamination. By utilizing the copolymers as a means of dispersing the nylon in the polyolefin, homogeneous blends are obtained which are improved with respect to impermeability, impact resistance, process stability, polymer morphology, etc.

In addition to the copolymer, it is obvious that other well-known ingredients may be used and included in the composition. These may include, for example, pigments, dyestuffs, inorganic fillers or the like. These may be mixed with the polymers prior to being subject to the kneading operation. The apparatus which may be employed for this purpose includes, for example, the Dulmage mixing screw with a gate valve installed between the discharge-end of the extruder barrel and the rod-forming die. A Bourdon-type pressure gauge and a thermalcouple are installed between the extruder barrel and the gate valve. With the valve completely open, the gauge indicates a pressure of about 250 p.s.i. and upon being slowly closed, the pressure reading approaches 1800 p.s.i. The speed of the screw drive is correspondingly increased to maintain the output flow essentially constant.

While this invention has been described with respect to a number of specific embodiments, it is obvious that there are other variations and modifications which can be employed without departing from the true spirit of the invention, except as more particularly pointed out in the appended claims.

What is claimed is:

1. A homogeneous polymeric blend substantially resistant to permeation of organic fluids and capable of being shaped into non-pinch-crazing forms which consists essentially of 25–90% by weight of a polyolefin resin, 5–70% by weight of a water-insoluble polyamide resin having recurring amide groups as integral parts of the polymer chain, and 1–10% by weight of a copolymer selected from the group consisting of an ethylene-acrylic acid copolymer and an ethylene-methacrylic acid copolymer wherein the acrylic and methacrylic acids range from 1–10 mole percent.

2. The composition of claim 1 further characterized in that the polyolefin resin ranges from about 40–55% by weight and the polyamide resin ranges from about 40–55% by weight.

3. The composition of claim 2 further characterized in that the ethylene-acrylic acid and ethylene-methacrylic acid copolymers range from about 2–6% by weight with the acrylic and methacrylic acids ranging from about 2–5% by weight of said copolymer.

4. The composition of claim 1 further characterized in that the polyolefin resin is polyethylene having a density of about 0.95.

5. The composition of claim 1 further characterized in that the polyolefin resin is polyethylene having a density of about 0.92.

6. A homogeneous polymeric blend substantially resistant to permeation of organic fluids and capable of being shaped to non-pinch-crazing forms which consists essentially of 45–50% by weight of a polyolefin resin, 45–50% by weight of a water-insoluble polyamide resin having recurring amide groups as integral parts of the polymer chain, and 2–6% by weight of an ethylene-acrylic acid copolymer wherein said acrylic acid ranges from about 2–5 mole percent.

7. The composition of claim 6 further characterized in that the polyolefin resin is polyethylene having a density of about 0.92.

8. The composition of claim 1 further characterized in that the polyolefin resin is polypropylene.

9. A method of preparing a homogeneous polymeric resin composition substantially resistant to the permeation of organic fluids and capable of being shaped into non-pinch-crazing forms which comprises kneading a mixture of polymeric resins at a temperature ranging from about 300° to 500° F. at pressures ranging from about 10 to 5,000 pounds per square inch; said polymeric resin mixture consisting essentially of 5–70% by weight of a polyamide resin, having recurring amide groups as integral parts of the polymer chain, 25–90% by weight of a polyolefin resin and 1–10% by weight of a copolymer selected from the group consisting of an ethylene-acrylic acid copolymer and an ethylene-methacrylic acid copolymer wherein the acrylic and methacrylic acids range from about 1–10 mole percent.

10. The method of claim 9 further characterized in that the polymeric mixture is kneaded at temperatures ranging from about 400° to 450° F. at pressures ranging from about 400 to 2,000 pounds per square inch.

11. The method of claim 10 further characterized in that the polyolefin resin is polyethylene having a density of about 0.95.

12. The method of claim 10 further characterized in that the polyamide resin ranges from about 40–55% by weight and the polyolefin resin ranges from about 40–55% by weight.

13. The method of claim 12 further characterized in that the ethylene-acrylic acid copolymer is present in an amount ranging from about 2–6% by weight of the polymeric resin mixture with the acrylic acid ranging from about 2–5 mole percent of the ethylene-acrylic acid copolymer.

14. The method of claim 13 further characterized in that the polyolefin resin is polyethylene having a density of about 0.92.

15. A method of preparing a homogeneous polymeric resin composition substantially resistant to the permeation of organic fluids and capable of being shaped into non-pinch-crazing forms which comprises kneading a mixture of polymeric resins at temperatures ranging from about 390° to 450° F. at pressures ranging from about 400 to 2,000 pounds per square inch; said polymeric resin mixture consisting essentially of 45–50% by weight of a polyolefin resin, 45–50% by weight of a polyamide resin, having recurring amide groups as integral parts of the polymer chain, and 2–6% by weight of an ethylene-acrylic acid copolymer wherein the acrylic acid is present in the copolymer in an amount of about three mole percent.

16. The method of claim 15 further characterized in that the polyolefin resin is polyethylene.

17. The method of claim 9 further characterized in that the polyolefin resin is polypropylene.

18. The method of claim 15 further characterized in that the polymeric resin composition is kneaded and shaped into non-pinch-crazing forms in an extruder at temperatures ranging from about 390° to 450° F.

19. The method of claim 18 further characterized in that the polymeric mixture is extruded at pressures ranging from about 400 to 2,000 pounds per square inch.

20. A method of preparing plastic bottles from a polymeric resin composition substantially resistant to the permeation of organic fluids and capable of being shaped into non-pinch-craze forms which comprises kneading a mixture of the polymeric resins in an extruder at temperatures ranging from about 390° to 450° F. at pressures ranging from about 400 to 2,000 pounds per square inch; said polymeric resin composition consisting essentially of 40–55% by weight of polyethylene, 40–55% by weight of a polyamide resin, having recurring amide groups as integral parts of the polymer chain, and 2–6% by weight of an ethylene-acrylic acid copolymer wherein the acrylic acid ranges from about 2–5 mole percent.

References Cited
UNITED STATES PATENTS

| | | | |
|---|---|---|---|
| 3,093,255 | 6/1963 | Mesrobian | 260—857 |
| 3,274,289 | 9/1966 | Murdock | 260—857 |

MURRAY TILLMAN, *Primary Examiner.*

P. LIBERMAN, *Assistant Examiner.*